(12) United States Patent
Kim

(10) Patent No.: US 11,607,943 B2
(45) Date of Patent: Mar. 21, 2023

(54) ROLL ROD FOR VEHICLE AND MANUFACTURING METHOD THEREOF

(71) Applicants: HYUNDAI MOTOR COMPANY, Seoul (KR); KIA MOTORS CORPORATION, Seoul (KR)

(72) Inventor: Seung Won Kim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 184 days.

(21) Appl. No.: 17/001,913

(22) Filed: Aug. 25, 2020

(65) Prior Publication Data
US 2021/0061083 A1 Mar. 4, 2021

(30) Foreign Application Priority Data
Sep. 2, 2019 (KR) .................. 10-2019-0108028

(51) Int. Cl.
*B60K 5/12* (2006.01)
*B29C 48/06* (2019.01)
*B29L 31/06* (2006.01)

(52) U.S. Cl.
CPC ............ *B60K 5/1241* (2013.01); *B29C 48/06* (2019.02); *B60K 5/1291* (2013.01); *B29L 2031/06* (2013.01)

(58) Field of Classification Search
CPC .... B60K 5/1241; B60K 5/1291; F16F 1/3849
See application file for complete search history.

(56) References Cited

U.S. PATENT DOCUMENTS

| 7,306,208 B2* | 12/2007 | Hwang | F16F 1/3849 |
| | | | 267/141.5 |
| 8,439,377 B2* | 5/2013 | Kim | B60K 5/1241 |
| | | | 280/124.109 |
| 8,556,242 B2* | 10/2013 | Kim | F16F 3/0873 |
| | | | 267/141.5 |
| 9,212,716 B2* | 12/2015 | Yoon | F16F 15/08 |
| 9,707,836 B2* | 7/2017 | Sykes | F16F 1/3849 |
| 9,868,345 B2* | 1/2018 | Kim | B60K 5/1241 |

(Continued)

FOREIGN PATENT DOCUMENTS

| JP | 6430224 B2 | 11/2018 |
| KR | 10-1995-0017323 A | 7/1995 |

(Continued)

*Primary Examiner* — Bradley Duckworth
(74) *Attorney, Agent, or Firm* — Lempia Summerfield Katz LLC

(57) ABSTRACT

A roll rod for a vehicle includes: a front insulator connected to a powertrain; a rod bracket to mount the front insulator on a front end portion of the rod bracket; a case bracket disposed outside the rod bracket and fastened to a vehicle body; a stopping rubber formed at a rear end portion of the rod bracket and disposed in an inner space defined by the case bracket; and a rear insulator formed between the rod bracket and the case bracket, where the rear insulator is secured to an outer side surface of the rod bracket and an inner side surface of the case bracket. The roll rod enhances an insulation rate against vibration of a powertrain and improves durability while reducing manufacturing costs through the simple structure and application of an extrusion molding method.

15 Claims, 9 Drawing Sheets

(56) References Cited

U.S. PATENT DOCUMENTS

| | | | |
|---|---|---|---|
| 10,173,513 B2* | 1/2019 | Kim | B60K 5/1216 |
| 10,436,279 B2* | 10/2019 | Kim | B60K 5/1241 |
| 10,780,768 B2* | 9/2020 | Tanaka | B60K 5/1208 |
| 10,981,441 B2* | 4/2021 | Tanaka | F16F 15/08 |
| 2015/0204405 A1 | 7/2015 | Shimada | |
| 2015/0240908 A1* | 8/2015 | Pizanti | F16C 7/04 |
| | | | 248/634 |
| 2021/0356014 A1* | 11/2021 | Purreiter | B60K 5/12 |

FOREIGN PATENT DOCUMENTS

| | | |
|---|---|---|
| KR | 10-2019-0007844 A | 1/2019 |
| KR | 10-2019-0016724 A | 2/2019 |

* cited by examiner

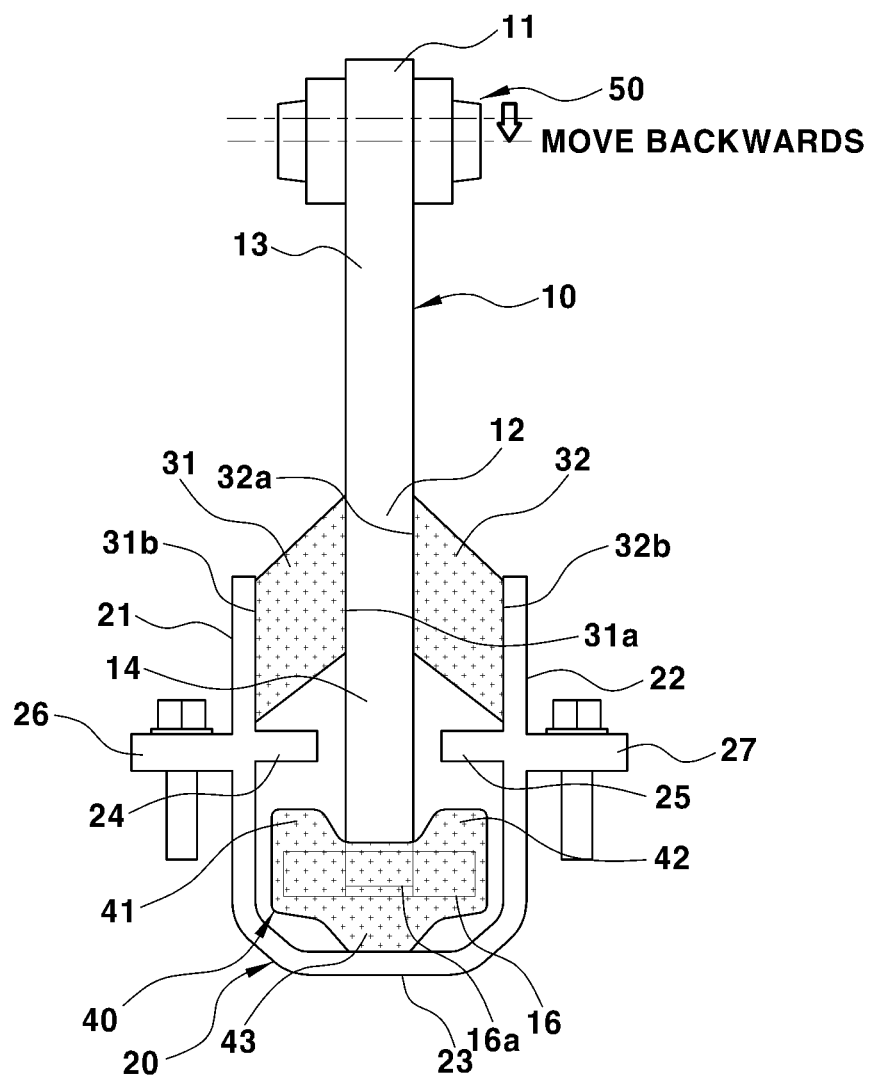

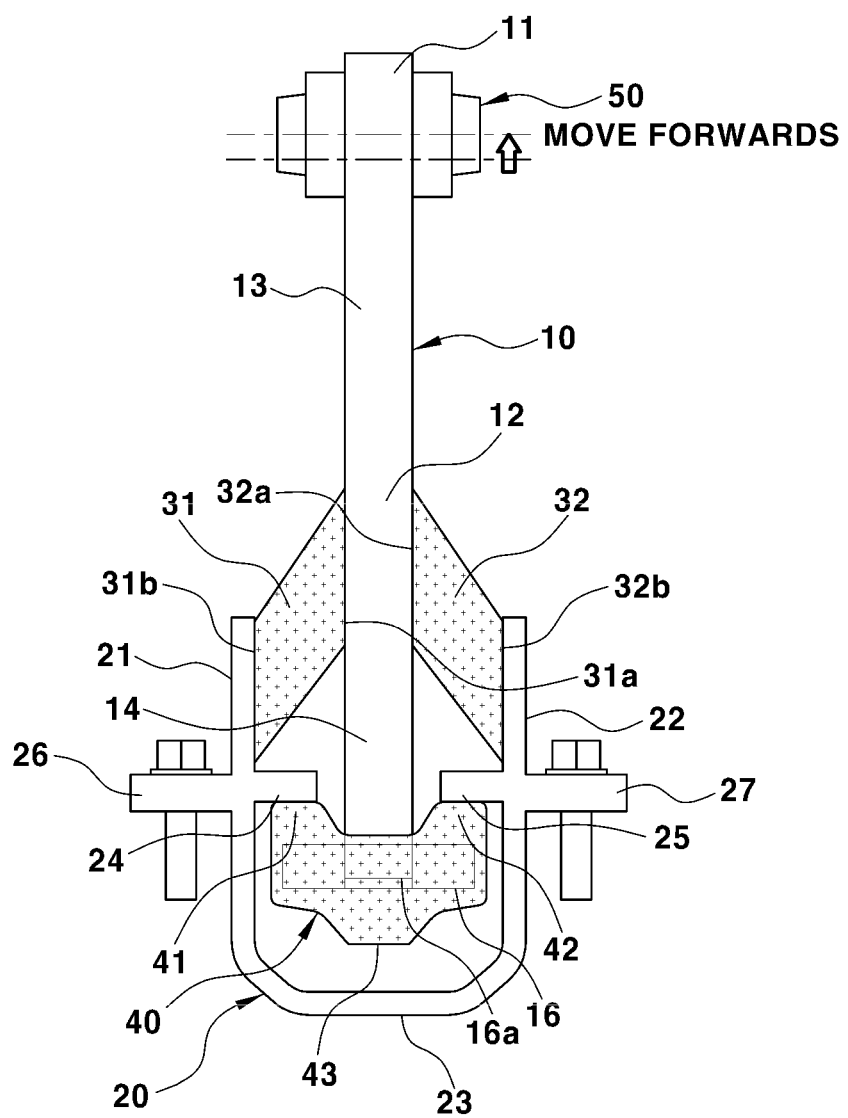

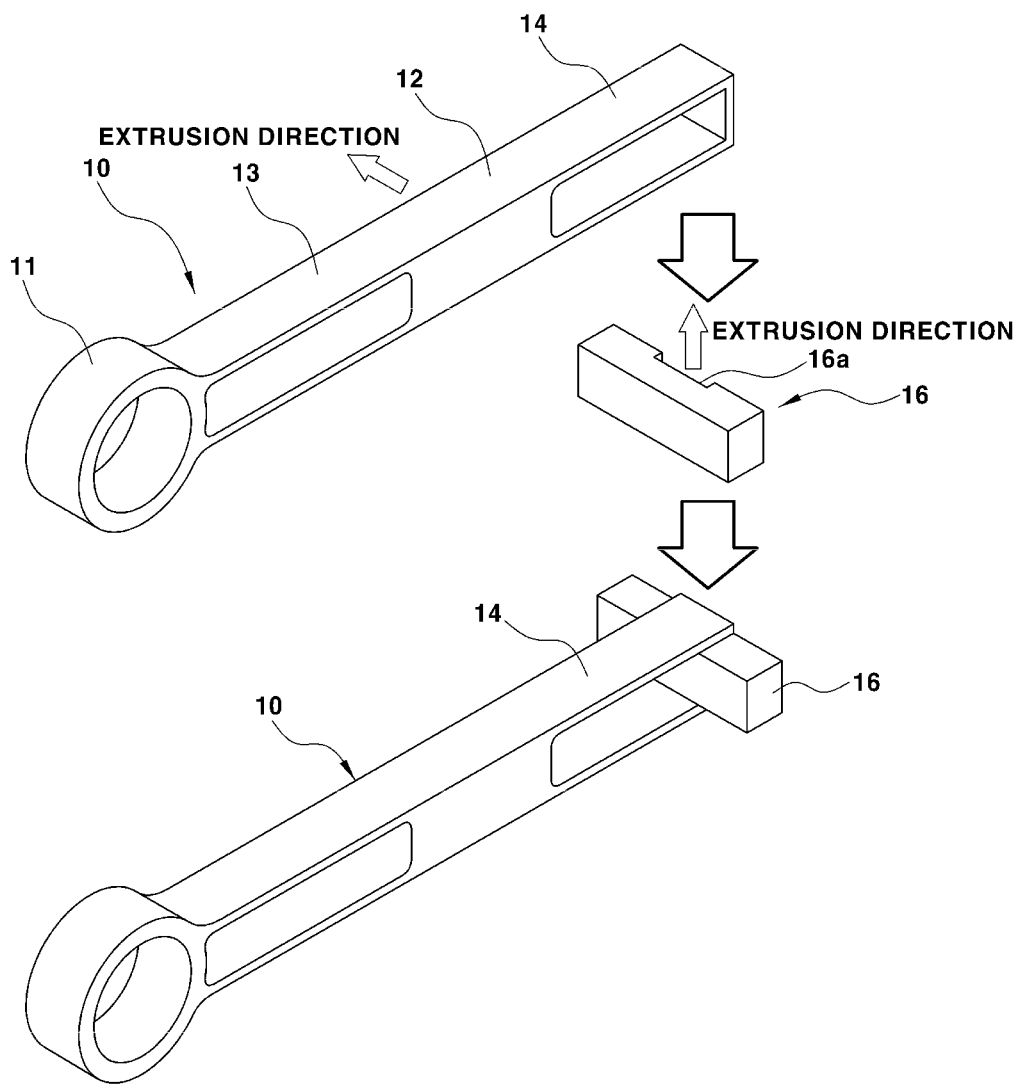

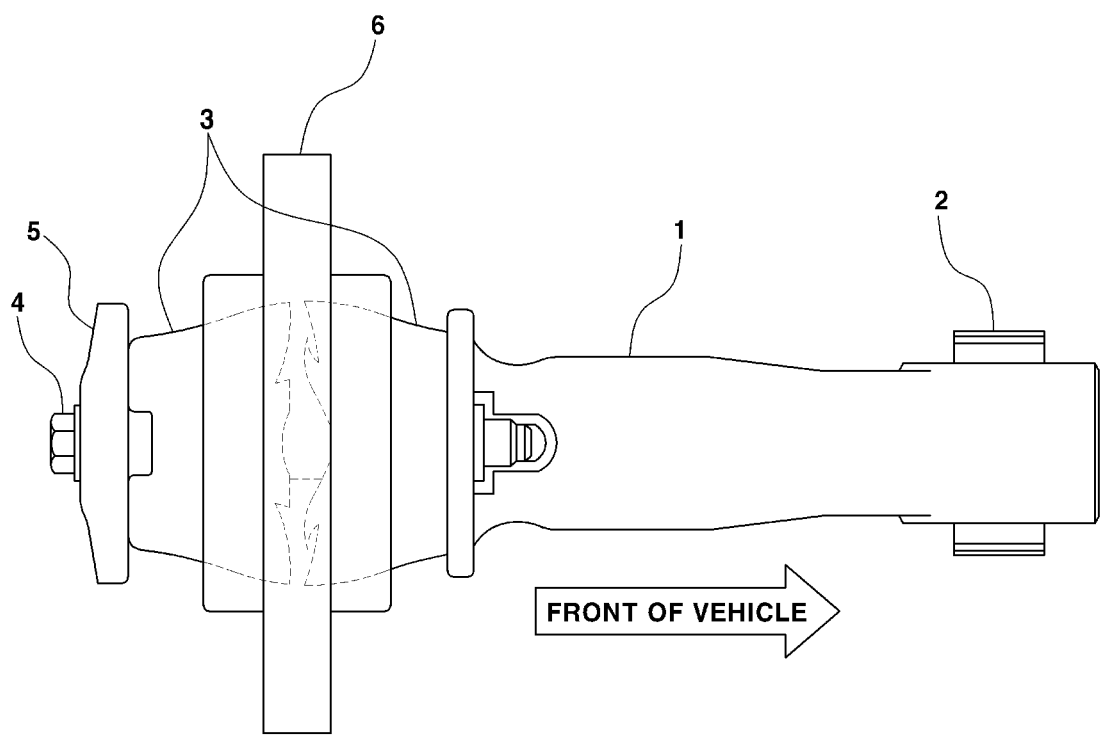
FIG. 7 "PRIOR ART"

ROLL ROD FOR VEHICLE AND MANUFACTURING METHOD THEREOF

CROSS-REFERENCE TO RELATED APPLICATION

This application claims priority to and the benefit of Korean Patent Application No. 10-2019-0108028, filed on Sep. 2, 2019, the entire contents of which are incorporated herein by reference.

FIELD

The present disclosure relates to a roll rod for a vehicle and a manufacturing method thereof.

BACKGROUND

The statements in this section merely provide background information related to the present disclosure and may not constitute prior art.

In general, as one of the mounting elements for supporting a powertrain of a vehicle, a roll rod connecting the powertrain to a vehicle body is used. The roll rod is interposed between the powertrain and the vehicle body in order to control the rolling movement of the powertrain and to insulate the vibration thereof.

FIG. 7 is a view showing a conventional roll rod for a vehicle.

As shown in FIG. 7, a conventional roll rod includes a rod bracket 1 interposed between a powertrain and a vehicle body, and further includes a front insulator 2 and a rear insulator 3, which are provided at opposite end portions of the rod bracket 1. The front insulator 2 is connected to the powertrain, and the rear insulator 3 is supported between an end plate 5 and the rod bracket 1 by a bolt member 4 and is connected to the vehicle body via a case bracket 6.

However, we have discovered that since this conventional roll rod is configured such that the rear insulator 3 is assembled between the end plate 5 and the rod bracket 1 in the state of being pre-compressed, it has high dynamic characteristics and thus has poor insulation performance.

In addition, the rod bracket 1 and the case bracket 6 of the conventional roll rod are processed through a squeeze method in order to secure rigidity. However, in the case of manufacturing the brackets 1 and 6 through the squeeze method, only two rod brackets 1 are manufactured using each set of molds due to the sizes of the brackets 1 and 6, which is very disadvantageous in terms of manufacturing costs. Further, since loss of material is large due to scraps, manufacturing costs are increased. Furthermore, in the case of the squeeze method, since a lot of pores are created in the molded product, the durability of the brackets 1 and 6 is deteriorated.

Moreover, since the conventional roll rod has a relatively complicated assembly structure, it is disadvantageous in terms of manufacturing costs and weight.

SUMMARY

The present disclosure provides a roll rod for a vehicle and a manufacturing method thereof for reducing manufacturing costs through simplification of the structure and application of an extrusion molding method and for enhancing insulation performance and durability against vibration of a powertrain.

In one form of the present disclosure, a roll rod for a vehicle includes: a front insulator connected to a powertrain, a rod bracket configured to mount the front insulator a front end portion thereof, a case bracket disposed outside the rod bracket, the case bracket being fastened to the vehicle body, a stopping rubber formed at the rear end portion of the rod bracket, the stopping rubber being disposed in an inner space defined by the case bracket, and a rear insulator formed between the rod bracket and the case bracket, the rear insulator being secured to an outer side surface of the rod bracket and an inner side surface of the case bracket.

In one form, the case bracket may include a first casing disposed on the left side of the rod bracket while being spaced a predetermined interval apart therefrom and a second casing disposed on the right side of the rod bracket while being spaced a predetermined interval apart therefrom. The rear insulator may include a first bridge rubber attached to an inner side surface of the first casing and a left surface of the rod bracket and a second bridge rubber attached to an inner side surface of the second casing and a right surface of the rod bracket.

In another form, the case bracket may further include a third casing disposed behind the rod bracket while being spaced a predetermined interval apart therefrom, a first wall formed on an inner side surface of the first casing and disposed behind the first bridge rubber, and a second wall formed on an inner side surface of the second casing and disposed behind the second bridge rubber. When the rod bracket is moved forwards, a front surface portion of the stopping rubber may be brought into contact with the first wall and the second wall, and when the rod bracket is moved backwards, a rear surface portion of the stopping rubber may be brought into contact with the third casing.

In still another form, the roll rod may further include a stopping bracket assembled to the rear end portion of the rod bracket, the stopping bracket being accommodated in the stopping rubber. The left portion of the stopping bracket may protrude in a leftward direction of the rod bracket and may be disposed behind the first wall, and the right portion of the stopping bracket may protrude in a rightward direction of the rod bracket and may be disposed behind the second wall.

In yet another form, the rod bracket may include a rear bore portion provided at the rear end portion thereof, and the stopping bracket may include a coupling recess formed in a middle portion thereof. The stopping bracket may be inserted into an inner space in the rear bore portion, and the rear end portion of the rear bore portion may be press-fitted into the coupling recess in the stopping bracket.

In still yet another form, the stopping rubber may include a rear contact portion formed at the rear surface portion thereof, and may further include a first front contact portion and a second front contact portion formed at the front surface portion thereof. The rear contact portion may be disposed behind the rod bracket, the first front contact portion may be disposed behind the first wall on the left side of the rod bracket, and the second front contact portion may be disposed behind the second wall on the right side of the rod bracket.

In some forms of the present disclosure, the first bridge rubber may include a first rod-bonding surface portion attached to a left surface of the rod bracket and a first case-bonding surface portion attached to an inner side surface of the first casing. The first rod-bonding surface portion may be disposed a predetermined distance further forwards than the first case-bonding surface portion. The second bridge rubber may include a second rod-bonding surface portion attached to a right surface of the rod bracket and a second case-bonding surface portion attached to an inner side surface of the second casing. The second rod-bonding surface portion may be disposed a predetermined distance further forwards than the second case-bonding surface portion.

In some forms of the present disclosure, the case bracket may further include a first vehicle-body-coupling portion protruding from an outer side surface of the first casing to be fastened to the vehicle body and a second vehicle-body-coupling portion protruding from an outer side surface of the second casing to be fastened to the vehicle body.

In another aspect, the present disclosure provides a method of manufacturing a roll rod for a vehicle including a front insulator connected to a powertrain, the method including a first step of forming a rod bracket through extrusion molding, the rod bracket including a front mounting portion formed at a front end portion thereof to which the front insulator is mounted, a second step of forming a case bracket through extrusion molding, the case bracket including a vehicle-body-coupling portion to be fastened to the vehicle body, a third step of placing the case bracket outside the rod bracket such that the rear end portion of the rod bracket is disposed in an inner space defined by the case bracket, and a fourth step of forming a rear insulator between an outer side surface of the rod bracket and an inner side surface of the case bracket and forming a stopping rubber at the rear end portion of the rod bracket disposed in the inner space defined by the case bracket.

In some forms of the present disclosure, the case bracket may include a first casing, a second casing, and a third casing. When the case bracket is placed outside the rod bracket in the third step, the first casing may be disposed on the left side of the rod bracket while being spaced a predetermined interval apart therefrom, the second casing may be disposed on the right side of the rod bracket while being spaced a predetermined interval apart therefrom, and the third casing may be disposed behind the rod bracket while being spaced a predetermined interval apart therefrom.

In some forms of the present disclosure, the rear insulator may include a first bridge rubber and a second bridge rubber. When the rear insulator is formed in the fourth step, the first bridge rubber may be attached to an inner side surface of the first casing and a left surface of the rod bracket, and the second bridge rubber may be attached to an inner side surface of the second casing and a right surface of the rod bracket.

In an exemplary form of the present disclosure, when the case bracket is formed in the second step, a first wall may be protrudingly formed at an inner side surface of the first casing, and a second wall may be protrudingly formed at an inner side surface of the second casing.

In yet another form, when the stopping rubber is formed in the fourth step, a rear surface portion of the stopping rubber may be spaced a predetermined interval apart from the third casing, and a front surface portion of the stopping rubber may be spaced a predetermined interval apart from the first wall and the second wall. When the rear insulator is formed, the stopping rubber may be formed simultaneously therewith.

In an exemplary form of the present disclosure, the method may further include forming a stopping bracket through extrusion molding, and before the third step, coupling the stopping bracket to the rear end portion of the rod bracket. When the case bracket is placed outside the rod bracket in the third step, a left portion of the stopping bracket may be disposed behind the first wall while being spaced a predetermined interval apart therefrom, and a right portion of the stopping bracket may be disposed behind the second wall while being spaced a predetermined interval apart therefrom.

In an exemplary form of the present disclosure, a rear bore portion may be formed at the rear end portion of the rod bracket, and a coupling recess may be formed in a middle portion of the stopping bracket. The stopping bracket may be coupled to the rear bore portion such that the stopping bracket is inserted into an inner space in the rear bore portion and the rear end portion of the rear bore portion is press-fitted into the coupling recess in the stopping bracket.

In an exemplary form of the present disclosure, when the stopping rubber is formed in the fourth step, a rear contact portion may be formed at the rear surface portion of the stopping rubber. The rear contact portion may be disposed behind the rod bracket and may be spaced a predetermined interval apart from the third casing.

In an exemplary form of the present disclosure, when the stopping rubber is formed in the fourth step, a first front contact portion and a second front contact portion may be formed at the front surface portion of the stopping rubber. The first front contact portion may be disposed behind the first wall while being spaced a predetermined interval apart therefrom on the left side of the rod bracket, and the second front contact portion may be disposed behind the second wall while being spaced a predetermined interval apart therefrom on the right side of the rod bracket.

In an exemplary form of the present disclosure, when the case bracket is formed through extrusion molding in the second step, a first vehicle-body-coupling portion may be protrudingly formed at an outer side surface of the first casing to be fastened to the vehicle body, and a second vehicle-body-coupling portion may be protrudingly formed at an outer side surface of the second casing to be fastened to the vehicle body.

In another form, the method may further include mounting the front insulator to the front mounting portion.

Other aspects and exemplary forms of the present disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 5A and 5B are views showing the operation of the roll rod in one form of the present disclosure;

FIGS. 6A to 6C are views showing the process of manufacturing the roll rod in one form of the present disclosure; and FIG. 7 is a view showing a conventional roll rod for a vehicle.

Figure 1:
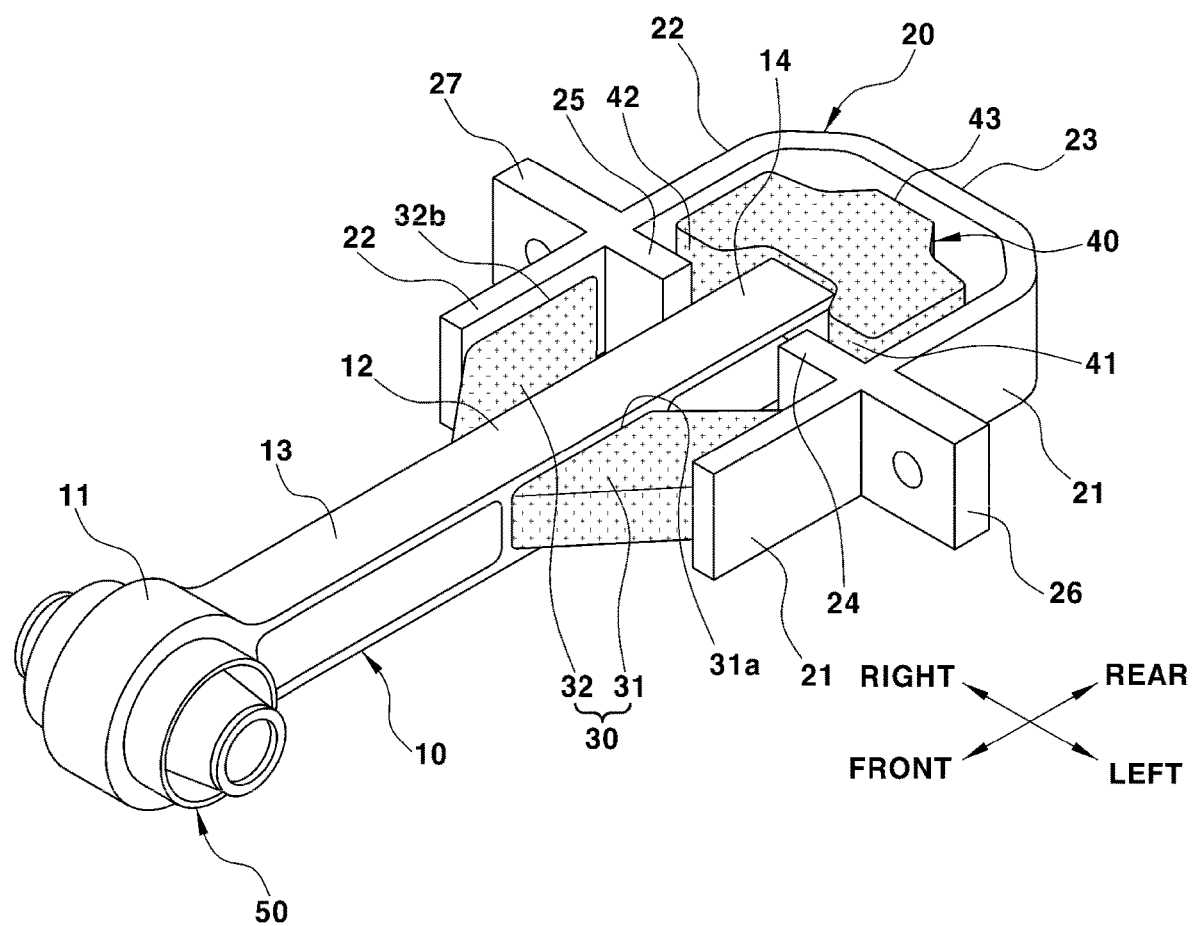
FIG. 1 is a perspective view of a roll rod in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, reference will now be made in detail to the exemplary forms of the present disclosure, examples of which are illustrated in the accompanying drawings.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes, will be determined in part by the particular intended application and use environment.

A roll rod for a vehicle according to one form of the present disclosure is used together with an engine mount, which is installed between the engine and the vehicle body, and a transmission mount, which is installed between the transmission and the vehicle body, in order to support the powertrain. The roll rod connects the powertrain to the vehicle body and serves to control the rolling movement of the powertrain and to insulate vibration noise.

Figure 2:
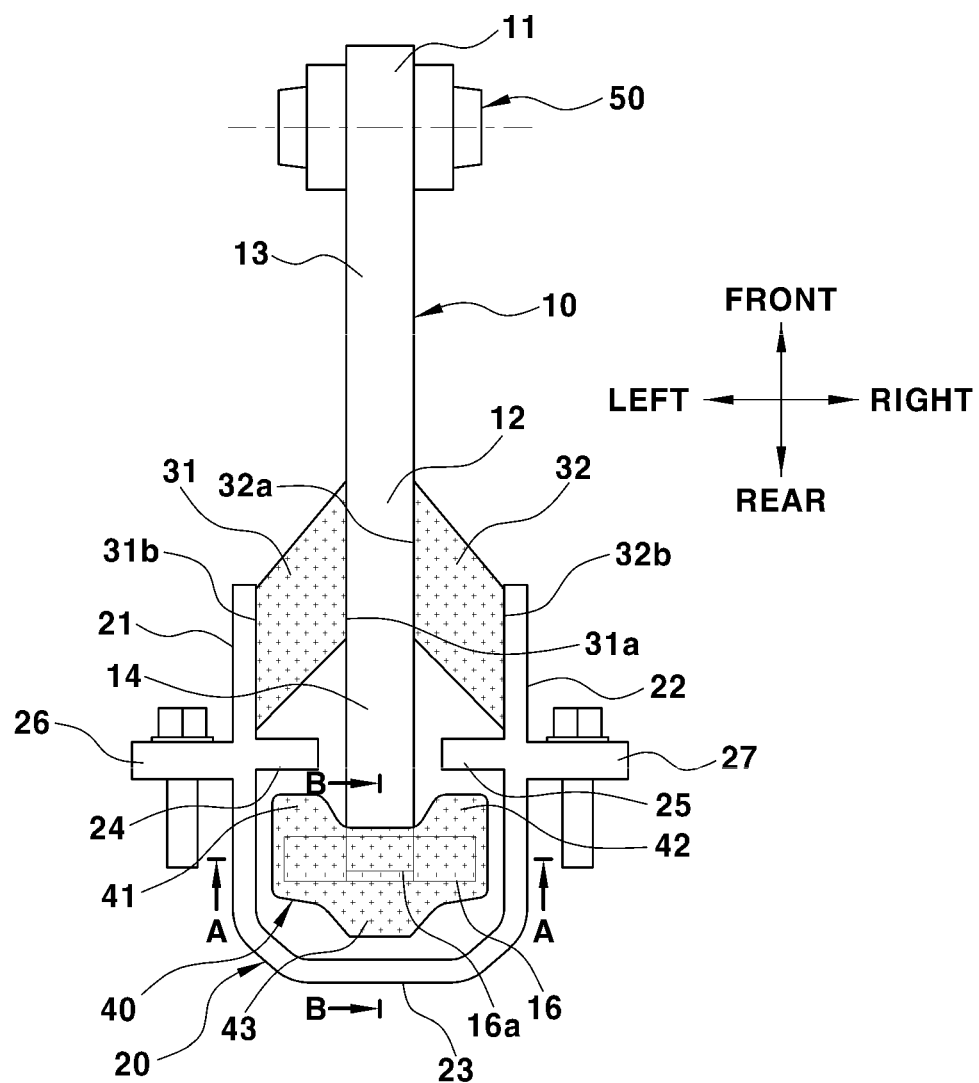
FIG. 2 is a plan view of the roll rod in one form of the present disclosure.

As shown in FIGS. 1 and 2, the roll rod may include a rod bracket 10, a case bracket 20, a rear insulator 30, a stopping rubber 40, and a front insulator 50.

The rod bracket 10 is disposed in the longitudinal direction of the vehicle and connects the powertrain to the vehicle body. The front insulator 50, which is coupled to the powertrain, may be mounted to the front end portion of the rod bracket 10, the stopping rubber 40 may be provided at the rear end portion of the rod bracket 10, and the rear insulator 30 may be provided at the middle portion of the rod bracket 10.

In one form, the rod bracket 10 may include a front mounting portion 11, a rear mounting portion 12, a front bore portion 13, and a rear bore portion 14, which are formed in a line in the longitudinal direction of the vehicle. The front mounting portion 11 may be formed in a cylindrical structure, and the front insulator 50 may be mounted in the front mounting portion 11 in a press-fitting manner. The rear mounting portion 12 may be formed in a structure having a rectangular cross-section, and the rear insulator 30 may be bonded to the outer side surface of the rear mounting portion 12. Each of the front bore portion 13 and the rear bore portion 14 may be formed in a rectangular cylindrical structure. The front bore portion 13 may be integrally formed with the front mounting portion 11 and the rear mounting portion 12 so as to be disposed therebetween. The rear bore portion 14 may be integrally formed with the rear mounting portion 12 so as to be disposed at the rear end portion the rear mounting portion 12.

The rod bracket 10 may be disposed between the powertrain and the vehicle body, and may be moved in the longitudinal direction of the vehicle according to the movement of the powertrain.

In addition, the rod bracket 10 may be formed through an extrusion molding method. To this end, the rod bracket 10 may have a simple structure enabling extrusion molding. In one form, the rod bracket 10 may be formed so as to have a uniform cross-section in the lateral direction of the vehicle. In other words, when the rod bracket 10 is formed, in order for the rod bracket 10 molded in the mold to be pushed and extruded from the mold, the rod bracket 10 may be formed such that the cross-section thereof is uniform in the extrusion direction thereof. That is, the cross-section of the rod bracket 10 may be maintained uniform in the direction in which the rod bracket 10 is extruded from the mold. The extrusion molding method, which is applied to the formation of the rod bracket 10, is advantageous in that the structure of the molded product is dense, high strength is secured, and the molding process is simple, and thus it is very economical in comparison with a general casting method.

The case bracket 20 is disposed outside the rod bracket 10 and is fastened to the vehicle body. The case bracket 20 surrounds the middle portion and the rear portion of the rod bracket 10 so as to be disposed around the rear insulator 30 and the stopping rubber 40. The case bracket 20 may be formed in a rectangular ring structure having one open side. That is, the case bracket 20 may be formed so as to have a U-shaped rectangular ring structure.

Referring to FIGS. 1 and 2, the case bracket 20 may include a first casing 21, a second casing 22, and a third casing 23. The first casing 21 may be formed in the structure of a panel having a predetermined size. The first casing 21 may be disposed on the left side of the rod bracket 10 while being spaced a predetermined interval apart therefrom. The second casing 22 may be formed in the structure of a panel having a predetermined size. The second casing 22 may be disposed on the right side of the rod bracket 10 while being spaced a predetermined interval apart therefrom. The first casing 21 and the second casing 22 may be disposed parallel to each other.

The third casing 23 may be formed in the structure of a panel having a predetermined size. The third casing 23 may be integrally formed with the first casing 21 and the second casing 22 so as to be disposed therebetween. The third casing 23 may be disposed behind the rod bracket 10 while being spaced a predetermined interval apart therefrom. The interval between the inner side surface of the first casing 21 and the left surface of the rod bracket 10 may be equal to the interval between the inner side surface of the second casing 22 and the right surface of the rod bracket 10.

In addition, the case bracket 20 may include a first wall 24 formed on the inner side surface of the first casing 21 and a second wall 25 formed on the inner side surface of the second casing 22. The first wall 24 may be formed so as to protrude from the inner side surface of the first casing 21 perpendicularly thereto. The second wall 25 may be formed so as to protrude from the inner side surface of the second casing 22 perpendicularly thereto. The first wall 24 and the second wall 25 may be disposed parallel to the third casing 23. In addition, the first wall 24 and the second wall 25 may be disposed in a straight line. The rear bore portion 14 of the rod bracket 10 may be disposed between the first wall 24 and the second wall 25. A predetermined interval may be present between the first wall 24 and the rear bore portion 14. A predetermined interval may be present between the second wall 25 and the rear bore portion 14.

In addition, the case bracket 20 may include a first vehicle-body-coupling portion 26 formed on the outer side surface of the first casing 21 and a second vehicle-body-coupling portion 27 formed on the outer side surface of the second casing 22. The first vehicle-body-coupling portion 26 may be formed so as to protrude from the outer side surface of the first casing 21 perpendicularly thereto. The second vehicle-body-coupling portion 27 may be formed so as to protrude from the outer side surface of the second casing 22 perpendicularly thereto. The first vehicle-body-coupling portion 26 and the second vehicle-body-coupling portion 27 may be disposed parallel to the third casing 23. In addition, the first vehicle-body-coupling portion 26 and the second vehicle-body-coupling portion 27 may be disposed in a straight line.

The case bracket 20 may be formed through an extrusion molding method. To this end, the case bracket 20 may have a simple structure enabling extrusion molding. In one form, the case bracket 20 may be formed so as to have a uniform cross-section in the lateral direction of the vehicle. In other words, when the case bracket 20 is formed through an extrusion molding method, in order for the case bracket 20 molded in the mold to be pushed and extruded from the mold, the case bracket 20 may be formed such that the cross-section thereof is uniform in the extrusion direction thereof.

Referring to FIGS. 1 and 2, the rear insulator 30 may be disposed between the rod bracket 10 and the case bracket 20. The rear insulator 30 may be formed through a vulcanization molding method. When the rear insulator 30 is formed, the rear insulator 30 may be bonded and secured to the outer side surface of the rod bracket 10 and the inner side surface of the case bracket 20.

In another form, the rear insulator 30 may include a first bridge rubber 31 and a second bridge rubber 32. The first bridge rubber 31 may be disposed between the first casing 21 and the rod bracket 10 and may be attached to the inner side surface of the first casing 21 and the left surface of the rod bracket 10. The second bridge rubber 32 may be disposed between the second casing 22 and the rod bracket 10, and may be attached to the inner side surface of the second casing 22 and the right surface of the rod bracket 10. In this case, one end portion of the first bridge rubber 31 (i.e. a first rod-bonding surface portion) may be bonded to the left surface of the rear mounting portion 12 of the rod bracket 10, and one end portion of the second bridge rubber 32 (i.e. a second rod-bonding surface portion) may be bonded to the right surface of the rear mounting portion 12.

The first bridge rubber 31 may be provided at the right portion thereof with the first rod-bonding surface portion 31a, and may be provided at the left portion thereof with a first case-bonding surface portion 31b. When the first bridge rubber 31 is formed, the first rod-bonding surface portion 31a may be attached and secured to the left surface of the rod bracket 10. When the first bridge rubber 31 is formed, the first case-bonding surface portion 31b may be attached and secured to the inner side surface of the first casing 21.

The second bridge rubber 32 may be provided at the left portion thereof with the second rod-bonding surface portion 32a, and may be provided at the right portion thereof with a second case-bonding surface portion 32b. When the second bridge rubber 32 is formed, the second rod-bonding surface portion 32a may be attached and secured to the right surface of the rod bracket 10. When the second bridge rubber 32 is formed, the second case-bonding surface portion 32b may be attached and secured to the inner side surface of the second casing 22.

In this case, the first rod-bonding surface portion 31a may be disposed a predetermined distance further forwards than the first case-bonding surface portion 31b, and the second rod-bonding surface portion 32a may be disposed a predetermined distance further forwards than the second case-bonding surface portion 32b. That is, the first bridge rubber 31 and the second bridge rubber 32 may be disposed so as to be tilted at a predetermined angle with respect to the forward/backward movement direction of the rod bracket 10. As a result, the durability of the first bridge rubber 31 and the second bridge rubber 32 against vibration of the powertrain may be enhanced.

Meanwhile, the stopping rubber 40 may be disposed at the rear end portion of the rod bracket 10. In this case, the stopping rubber 40 may be formed through a vulcanization molding method, and may be disposed in the inner space defined by the case bracket 20. In order to enhance the stopping performance and durability of the stopping rubber 40, a stopping bracket 16 may be disposed inside the stopping rubber 40 (refer to FIGS. 3 and 4). The stopping bracket 16 may serve as a frame of the stopping rubber 40.

Referring to FIGS. 3 to 6C, the stopping bracket 16 may be assembled to the rear end portion of the rod bracket 10 before the stopping rubber 40 is formed. The stopping bracket 16 may have a coupling recess 16a formed in the middle portion thereof, into which the rear end portion of the rear bore portion 14 may be inserted and coupled in a press-fitting manner. For example, the stopping bracket 16 inserted into the inner space in the rear bore portion 14 may be pressed toward the rear end portion of the rear bore portion 14 and may be coupled to the rear end portion of the rear bore portion 14.

The stopping bracket 16 is enveloped by the stopping rubber 40 when the stopping rubber 40 is formed at the rear end portion of the rod bracket 10. That is, the stopping bracket 16 may be embedded in the stopping rubber 40.

In order to prevent the stopping bracket 16 from being separated from the rod bracket 10, the stopping rubber 40 may be provided at the rear surface thereof with a rear contact portion 43. In addition, in order to reduce the weight of the stopping rubber 40, the stopping rubber 40 may be provided at the front surface thereof with a first front contact portion 41 and a second front contact portion 42. That is, the front surface portion of the stopping rubber 40 may be formed such that a portion between the first front contact portion 41 and the second front contact portion 42 is concavely recessed. In other words, the middle portion of the front surface portion of the stopping rubber 40 may be concavely recessed.

The first front contact portion 41 and the second front contact portion 42 may be formed so as to protrude in the forward direction of the stopping rubber 40, and the rear contact portion 43 may be formed so as to protrude in the backward direction of the stopping rubber 40. The rear contact portion 43 may be disposed neither on the rear-left side of the stopping bracket 16 nor on the rear-right side of the stopping bracket 16.

In one form, the first front contact portion 41 may be disposed on the left side of the rod bracket 10, the second front contact portion 42 may be disposed on the right side of the rod bracket 10, and the rear contact portion 43 may be disposed behind the rod bracket 10 so as to be aligned with the rod bracket 10. In this case, the first front contact portion 41 may be disposed behind the first wall 24 while being spaced a predetermined interval apart therefrom, the second front contact portion 42 may be disposed behind the second wall 25 while being spaced a predetermined interval apart therefrom, and the rear contact portion 43 may be disposed ahead of the third casing 23 while being spaced a predetermined interval apart therefrom.

Accordingly, as shown in FIGS. 5A and 5B, when the rod bracket 10 is moved in the forward direction of the vehicle by the movement of the powertrain, the first front contact portion 41 and the second front contact portion 42 are brought into contact with the first wall 24 and the second wall 25, respectively, and the rear contact portion 43 is brought into contact with the third casing 23. As a result, excessive deformation of the rear insulator 30 may be prevented, and the movement of the rod bracket 10 may be restricted.

When the stopping rubber 40 collides with the first wall 24 and the second wall 25, most of the collision load is applied to the first front contact portion 41 and the second front contact portion 42. Thus, the left portion and the right portion of the stopping bracket 16, which are located behind the first front contact portion 41 and the second front contact portion 42, are pressed backwards. As a result, the coupling force between the rod bracket 10 and the stopping bracket 16 may be increased.

Figure 3:
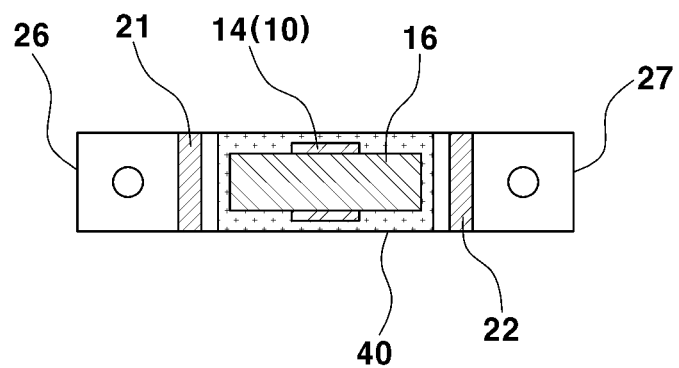
FIG. 3 is a cross-sectional view taken along line A-A in FIG. 2.
Figure 4:
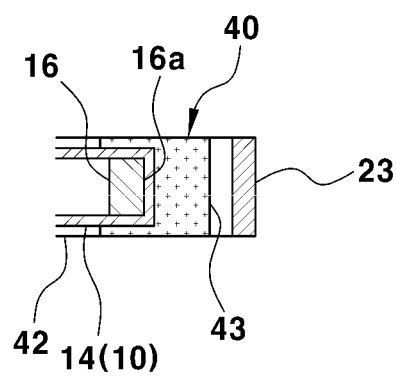
FIG. 4 is a cross-sectional view taken along line B-B in FIG. 2.

Referring to FIGS. 2 and 3, the left portion and the right portion of the stopping bracket 16 protrude in the leftward direction and the rightward direction of the rod bracket 10, respectively, inside the stopping rubber 40. That is, the left portion of the stopping bracket 16 may be disposed behind the first wall 24, and the right portion of the stopping bracket 16 may be disposed behind the second wall 25.

When the stopping rubber 40 collides with the third casing 23, most of the collision load is applied to the rear contact portion 43. Thus, most of the collision load is applied to the rear end portion of the rod bracket 10, which is located ahead of the rear contact portion 43, and almost none of the collision load is applied to the left portion or the right portion of the stopping bracket 16. Accordingly, the stopping bracket 16 may be prevented from being pressed in the direction in which the stopping bracket 16 is separated from the rear end portion of the rod bracket 10. In addition, the rod bracket 10 may be pressed toward the stopping bracket 16, and thus the coupling force between the rod bracket 10 and the stopping bracket 16 may be increased.

Although not shown in the drawings, in another form, the first front contact portion 41 and the second front contact portion 42 may be omitted from the front surface portion of the stopping rubber 40, and the rear contact portion 43 may be omitted from the rear surface portion of the stopping rubber 40. In the case in which the front contact portions 41 and 42 and the rear contact portion 43 are omitted, the rear surface portion of the stopping rubber 40 may be disposed so as to be spaced a predetermined interval apart from the third casing 23, and the front surface portion of the stopping rubber 40 may be disposed so as to be spaced a predetermined interval apart from the first wall 24 and the second wall 25.

Similar to the rod bracket 10 and the case bracket 20, the stopping bracket 16 may also be formed through an extrusion molding method. To this end, the stopping bracket 16 may have a simple structure enabling extrusion molding. In one form, the stopping bracket 16 may be formed so as to have a uniform cross-section in the lateral direction of the vehicle. In other words, when the stopping bracket 16 is formed through an extrusion molding method, in order for the stopping bracket 16 molded in the mold to be pushed and extruded from the mold, the stopping bracket 16 may be formed such that the cross-section thereof is uniform in the extrusion direction thereof.

Here, the rod bracket 10, the case bracket 20, and the stopping bracket 16 may be made of aluminum through an extrusion molding method.

Figure 6B:
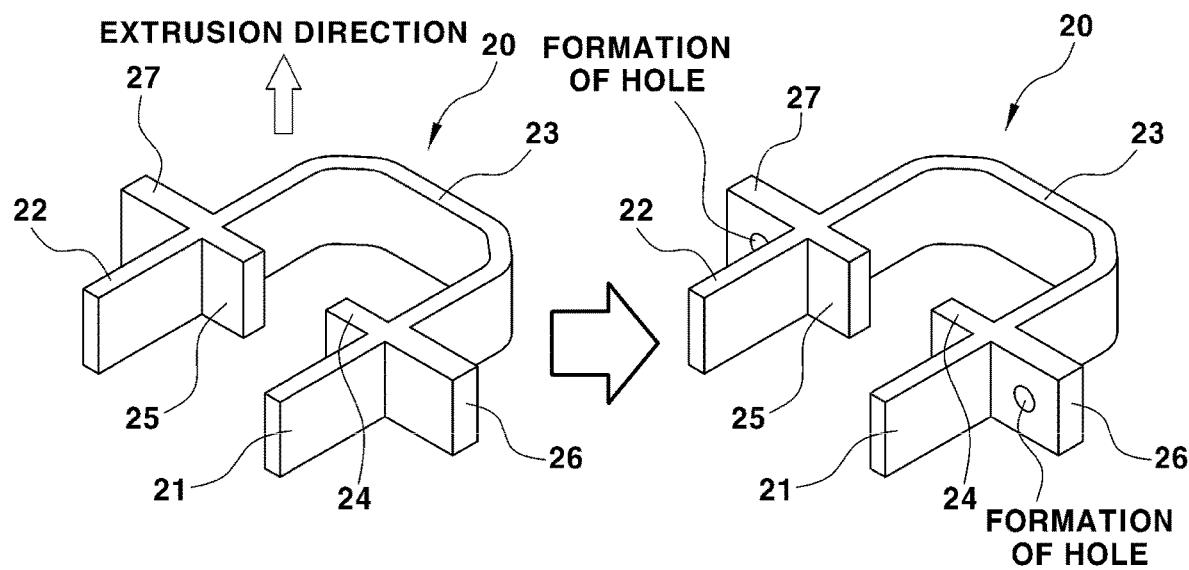
Figure 6C:
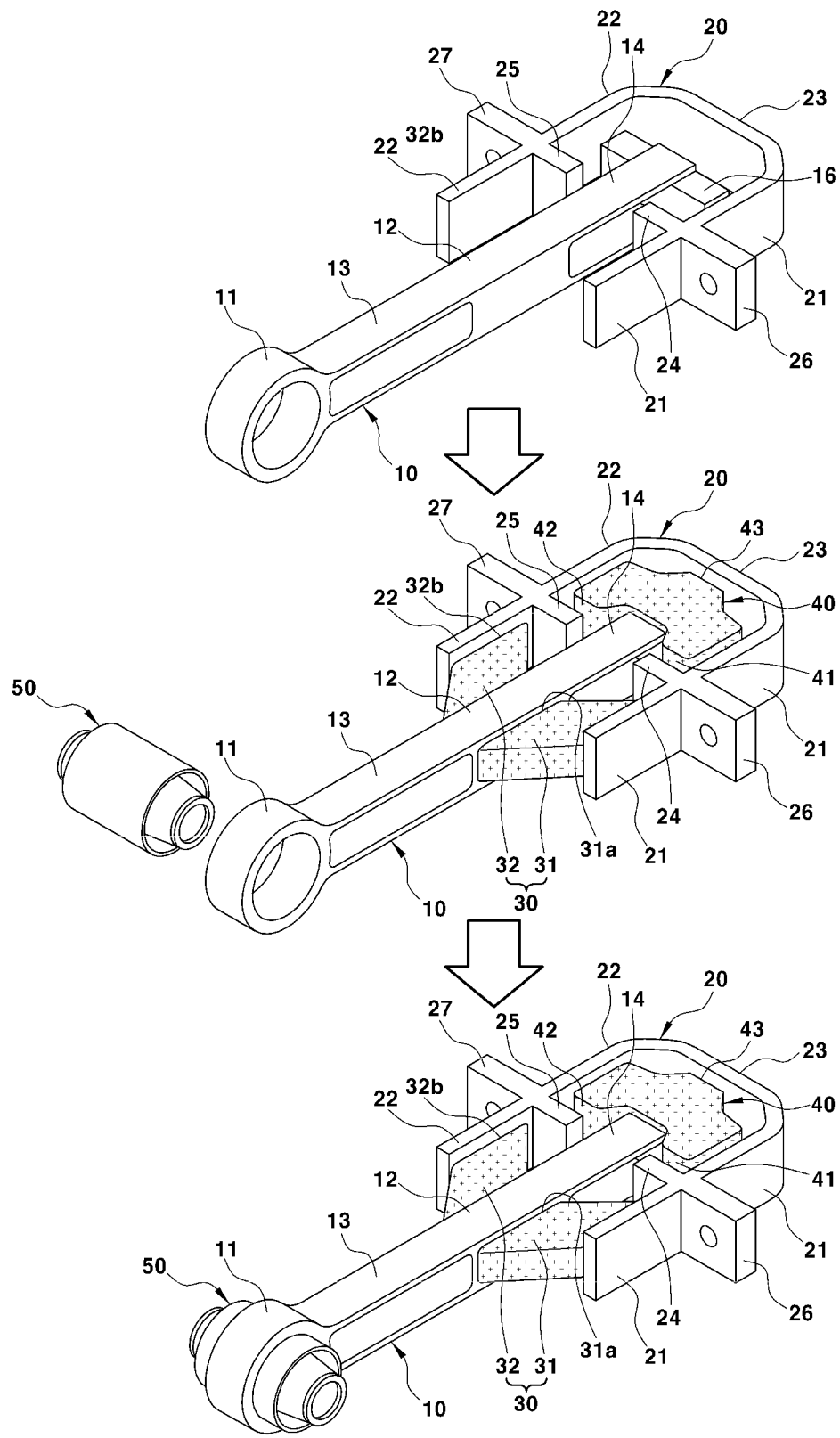

The roll rod configured as described above may be manufactured as follows. FIG. 6A shows the step of forming and assembling the rod bracket 10 and the stopping bracket 16, FIG. 6B shows the step of forming and processing the case bracket 20, and FIG. 6C shows the step of placing the case bracket 20 outside the rod bracket 10 and the step of forming the rear insulator 30 and the stopping rubber 40. FIG. 6C also shows the step of assembling the front insulator 50.

The process of manufacturing the roll rod may include a first step of forming the rod bracket 10 through extrusion molding, a second step of forming the case bracket 20 through extrusion molding, a third step of placing the case bracket 20 outside the rod bracket 10, and a fourth step of forming the rear insulator 30 and the stopping rubber 40.

Referring to FIG. 6A, the extrusion molding of the stopping bracket 16 may be performed after the extrusion molding of the rod bracket 10. In order to enhance the stopping performance and durability of the stopping rubber 40, the stopping bracket 16 may be assembled to the rear end portion of the rod bracket 10 before the stopping rubber 40 is formed. In this case, the rear end portion of the rod bracket 10 may be press-fitted and secured in the coupling recess 16a in the stopping bracket 16.

Referring to FIG. 6B, after the extrusion molding of the case bracket 20 is performed, holes may be formed in the first vehicle-body-coupling portion 26 and the second vehicle-body-coupling portion 27 of the case bracket 20. The holes may be used when the case bracket 20 is bolted to the vehicle body.

Referring to FIG. 6C, when the case bracket 20 is placed outside the rod bracket 10, the case bracket 20 may surround the rod bracket 10 except for the front mounting portion 11 of the rod bracket 10. That is, when the case bracket 20 is placed outside the rod bracket 10, the case bracket 20 surrounds the middle portion and the rear portion of the rod bracket 10. Specifically, the first casing 21 may be disposed on the left side of the rod bracket 10 while being spaced a predetermined interval apart therefrom, the second casing 22 may be disposed on the right side of the rod bracket 10 while being spaced a predetermined interval apart therefrom, and the third casing 23 may be disposed behind the rod bracket 10 while being spaced a predetermined interval apart therefrom. The stopping bracket 16 may be disposed in the space surrounded by the first wall 24, the second wall 25, and the third casing 23 (i.e. the inner space defined by the case bracket 20). In this case, the left portion of the stopping bracket 16 may be disposed behind the first wall 24 while being spaced a predetermined interval apart therefrom, and the right portion of the stopping bracket 16 may be disposed behind the second wall 25 while being spaced a predetermined interval apart therefrom.

After the case bracket 20 is placed outside the rod bracket 10 as described above, the rear insulator 30 is formed between the outer side surface of the rod bracket 10 and the inner side surface of the case bracket 20, and the stopping rubber 40 is formed at the rear end portion of the rod bracket 10 and on the outer surface of the stopping bracket 16. The rear insulator 30 and the stopping rubber 40 may be formed through a vulcanization molding method. In this case, the rear insulator 30 and the stopping rubber 40 may be formed at the same time.

Simultaneously with the formation of the rear insulator 30, the rear insulator 30 may be attached and secured to the rod bracket 10 and the case bracket 20. Simultaneously with the formation of the stopping rubber 40, the stopping rubber 40 may be bonded and secured to the rear end portion of the rod bracket 10 and the outer surface of the stopping bracket 16. Thus, the roll rod does not require a separate assembly process other than the step of mounting the stopping bracket 16 to the rear end portion of the rod bracket 10.

The rear insulator 30 may include the first bridge rubber 31 and the second bridge rubber 32. Referring to FIG. 6C, when the bridge rubbers 31 and 32 are formed, the first bridge rubber 31 may be attached to the inner side surface of the first casing 21 and the left surface of the rear mounting portion 12 of the rod bracket 10, and the second bridge rubber 32 may be attached to the inner side surface of the second casing 22 and the right surface of the rear mounting portion 12 of the rod bracket 10. In addition, when the stopping rubber 40 is formed, the rear surface portion of the stopping rubber 40 may be disposed so as to be spaced a predetermined interval apart from the third casing 23, and the front surface portion of the stopping rubber 40 may be disposed so as to be spaced a predetermined interval apart from the first wall 24 and the second wall 25.

When the stopping rubber 40 is formed, the rear contact portion 43 may be formed at the rear surface portion of the stopping rubber 40, and may be disposed behind the rod bracket 10, and the first front contact portion 41 and the second front contact portion 42 may be formed at the front surface portion of the stopping rubber 40. The first front contact portion 41 may be disposed behind the first wall 24 on the left side of the rod bracket 10, and the second front contact portion 42 may be disposed behind the second wall 25 on the right side of the rod bracket 10.

In addition, the front insulator 50 may be mounted in the inner space in the front mounting portion 11, which is formed at the front end portion of the rod bracket 10, in a press-fitting manner.

As is apparent from the above description, according to the roll rod configured and manufactured as described above, when the powertrain makes a small-displacement movement, the rear insulator 30 absorbs vibration, and when the powertrain makes a large-displacement movement, the rear insulator 30 absorbs vibration while the stopping rubber 40 restricts the forward/backward movement of the rod bracket 10. In addition, when the powertrain makes a large-displacement movement, the stopping rubber 40 restricts deformation of the rear insulator 30. As a result, the insulation performance and durability of the roll rod against the movement of the powertrain may be secured.

In addition, since the brackets 10, 16 and 20 constituting the roll rod are formed through an extrusion molding method, the cost of manufacturing the roll rod may be reduced. In addition, since the roll rod has a simple assembly structure, it is advantageous in terms of cost and weight.

The present disclosure has been described in detail with reference to exemplary forms thereof. However, it will be appreciated by those skilled in the art that changes may be made in these forms without departing from the principles and spirit of the present disclosure.

What is claimed is:

1. A roll rod for a vehicle, comprising:
a front insulator connected to a powertrain;
a rod bracket configured to mount the front insulator on a front end portion thereof;
a case bracket disposed outside the rod bracket, the case bracket being fastened to a vehicle body;
a stopping rubber formed at a rear end portion of the rod bracket, the stopping rubber being disposed in an inner space defined by the case bracket; and
a rear insulator formed between the rod bracket and the case bracket, the rear insulator being secured to an outer side surface of the rod bracket and an inner side surface of the case bracket,
wherein the case bracket comprises:
a first casing disposed on a left side of the rod bracket while being spaced a predetermined interval apart therefrom,
a second casing disposed on a right side of the rod bracket while being spaced a predetermined interval apart therefrom, and
a third casing disposed behind the rod bracket while being spaced a predetermined interval apart therefrom,
wherein the rear insulator comprises:
a first bridge rubber attached to an inner side surface of the first casing and a left surface of the rod bracket, and
a second bridge rubber attached to an inner side surface of the second casing and a right surface of the rod bracket, and
wherein the case bracket further comprises:
a first wall formed on an inner side surface of the first casing and disposed behind the first bridge rubber and ahead of the stopping rubber, and
a second wall formed on an inner side surface of the second casing and disposed behind the second bridge rubber and ahead of the stopping rubber.

2. The roll rod of claim 1,
wherein when the rod bracket is moved forwards, a front surface portion of the stopping rubber is brought into contact with the first wall and the second wall of the case bracket, and when the rod bracket is moved backwards, a rear surface portion of the stopping rubber is brought into contact with the third casing of the case bracket.

3. The roll rod of claim 2, further comprising:
a stopping bracket assembled to a rear end portion of the rod bracket, the stopping bracket being accommodated in the stopping rubber,
wherein a left portion of the stopping bracket protrudes in a leftward direction of the rod bracket and is disposed behind the first wall, and a right portion of the stopping bracket protrudes in a rightward direction of the rod bracket and is disposed behind the second wall.

4. The roll rod of claim 3, wherein:
the rod bracket comprises a rear bore portion provided at the rear end portion thereof,
the stopping bracket comprises a coupling recess formed in a middle portion thereof, and
the stopping bracket is inserted into an inner space in the rear bore portion, and a rear end portion of the rear bore portion is press-fitted into the coupling recess in the stopping bracket.

5. The roll rod of claim 3, wherein the stopping rubber comprises: a rear contact portion formed at the rear surface portion thereof, and a first front contact portion and a second front contact portion formed at the front surface portion thereof, and wherein the rear contact portion is disposed behind the rod bracket, the first front contact portion is disposed behind the first wall on a left side of the rod bracket, and the second front contact portion is disposed behind the second wall on a right side of the rod bracket.

6. The roll rod of claim 1, wherein the first bridge rubber comprises: a first rod-bonding surface portion attached to the left surface of the rod bracket, and a first case-bonding surface portion attached to the inner side surface of the first casing,
   wherein the first rod-bonding surface portion is disposed a predetermined distance further forwards than the first case-bonding surface portion, and
   wherein the second bridge rubber comprises: a second rod-bonding surface portion attached to the right surface of the rod bracket, and a second case-bonding surface portion attached to the inner side surface of the second casing, the second rod-bonding surface portion being disposed a predetermined distance further forwards than the second case-bonding surface portion.

7. The roll rod of claim 1, wherein the case bracket further comprises: a first vehicle-body-coupling portion protruding from an outer side surface of the first casing to be fastened to a vehicle body, and a second vehicle-body-coupling portion protruding from an outer side surface of the second casing to be fastened to the vehicle body.

8. A method of manufacturing a roll rod for a vehicle comprising a front insulator connected to a powertrain, the method comprising:
   forming a rod bracket, the rod bracket comprising a front mounting portion formed at a front end portion thereof to which the front insulator is mounted;
   forming a case bracket, the case bracket comprising a vehicle-body-coupling portion to be fastened to a vehicle body;
   placing the case bracket outside the rod bracket such that a rear end portion of the rod bracket is disposed in an inner space defined by the case bracket;
   forming a rear insulator between an outer side surface of the rod bracket and an inner side surface of the case bracket, wherein the rear insulator comprises a first bridge rubber and a second bridge rubber; and
   forming a stopping rubber at the rear end portion of the rod bracket disposed in the inner space defined by the case bracket,
   wherein the case bracket comprises a first casing, a second casing, and a third casing, and
   wherein, when placing the case bracket outside of the rod bracket, the first casing is disposed on a left side of the rod bracket while being spaced a predetermined interval apart therefrom, the second casing is disposed on a right side of the rod bracket while being spaced a predetermined interval apart therefrom, and the third casing is disposed behind the rod bracket while being spaced a predetermined interval apart therefrom,
   wherein, when forming the rear insulator, the first bridge rubber is attached to an inner side surface of the first casing and a left surface of the rod bracket, and the second bridge rubber is attached to an inner side surface of the second casing and a right surface of the rod bracket,
   wherein, when forming the case bracket, a first wall is protrudingly formed at an inner side surface of the first casing, and a second wall is protrudingly formed at an inner side surface of the second casing,
   wherein, when forming the stopping rubber, a rear surface portion of the stopping rubber is spaced a predetermined interval apart from the third casing, and a front surface portion of the stopping rubber is spaced a predetermined interval apart from the first wall and the second wall, and
   wherein the first wall is disposed behind the first bridge rubber, and the second wall disposed behind the second bridge rubber.

9. The method of claim 8, wherein, while forming the stopping rubber, a rear contact portion is formed at the rear surface portion of the stopping rubber, and
   wherein the rear contact portion is disposed behind the rod bracket and is spaced a predetermined interval apart from the third casing.

10. The method of claim 8, wherein, while forming the stopping rubber, a first front contact portion and a second front contact portion are formed at the front surface portion of the stopping rubber, and
    wherein the first front contact portion is disposed behind the first wall while being spaced a predetermined interval apart therefrom on a left side of the rod bracket, and the second front contact portion is disposed behind the second wall while being spaced a predetermined interval apart therefrom on a right side of the rod bracket.

11. The method of claim 8, further comprising:
    forming a stopping bracket through extrusion molding; and
    before placing the case bracket outside of the rod bracket, coupling the stopping bracket to a rear end portion of the rod bracket,
    wherein, when the case bracket is placed outside of the rod bracket, a left portion of the stopping bracket is disposed behind the first wall while being spaced a predetermined interval apart therefrom, and a right portion of the stopping bracket is disposed behind the second wall while being spaced a predetermined interval apart therefrom.

12. The method of claim 11, wherein a rear bore portion is formed at the rear end portion of the rod bracket,
    wherein a coupling recess is formed in a middle portion of the stopping bracket, and
    wherein the stopping bracket is coupled to the rear bore portion such that the stopping bracket is inserted into an inner space in the rear bore portion and a rear end portion of the rear bore portion is press-fitted into the coupling recess in the stopping bracket.

13. The method of claim 8, wherein, when the rear insulator is formed, the stopping rubber is formed simultaneously therewith.

14. The method of claim 8, wherein, when forming the case bracket, a first vehicle-body-coupling portion is protrudingly formed at an outer side surface of the first casing of the case bracket to be fastened to the vehicle body, and a second vehicle-body-coupling portion is protrudingly formed at an outer side surface of the second casing of the case bracket to be fastened to the vehicle body.

15. The method of claim 8, further comprising:
    mounting the front insulator to the front mounting portion.

* * * * *